(12) United States Patent
McCutchan

(10) Patent No.: US 8,065,867 B2
(45) Date of Patent: Nov. 29, 2011

(54) RADIAL BALL BEARING

(75) Inventor: Sean McCutchan, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 771 days.

(21) Appl. No.: 12/142,835

(22) Filed: Jun. 20, 2008

(65) Prior Publication Data

US 2009/0313965 A1  Dec. 24, 2009

(51) Int. Cl.
 *F02K 3/02* (2006.01)
 *F16C 33/60* (2006.01)
(52) U.S. Cl. ........ 60/226.1; 384/499; 384/505; 384/506
(58) Field of Classification Search ............... 384/499, 384/502, 505, 506; 60/416
See application file for complete search history.

(56) References Cited

U.S. PATENT DOCUMENTS

| | | | |
|---|---|---|---|
| 1,093,348 A * | 4/1914 | Mooers ............. | 384/506 |
| 1,195,952 A * | 8/1916 | Fox ................. | 384/505 |
| 3,978,566 A | 9/1976 | Ladin | |
| 3,980,359 A | 9/1976 | Wetherbee | |
| 4,363,527 A | 12/1982 | Thrasher | |
| 4,463,994 A | 8/1984 | Eliason | |
| 4,797,014 A | 1/1989 | Nicolich | |
| 5,096,310 A | 3/1992 | Meining | |
| 5,106,209 A | 4/1992 | Atkinson | |
| 5,183,342 A | 2/1993 | Daiber | |
| 5,201,844 A | 4/1993 | Greenwood | |
| 5,740,893 A | 4/1998 | Yamamoto | |
| 6,491,497 B1 * | 12/2002 | Allmon et al. ......... | 416/174 |
| 6,511,228 B2 | 1/2003 | Dusza | |
| 6,758,598 B2 | 7/2004 | Beauvais | |
| 7,448,806 B2 * | 11/2008 | Ishiguro et al. ........ | 384/417 |

FOREIGN PATENT DOCUMENTS

| | | |
|---|---|---|
| EP | 1191191 | 3/2002 |
| JP | 2006105202 | 4/2006 |

* cited by examiner

*Primary Examiner* — William Rodriguez
*Assistant Examiner* — Arun Goyal
(74) *Attorney, Agent, or Firm* — Carlson, Gaskey & Olds, PC

(57) ABSTRACT

A bearing assembly includes an outer race and an inner race with a ball bearing element located between the inner and the outer races. The inner race has a first portion and a second portion separated from the first portion by a split. The first portion includes a first curved inner race support surface defined by a first center point and the second portion includes a second curved inner race support surface defined by a second center point that is non-coincident with the first center point.

14 Claims, 5 Drawing Sheets

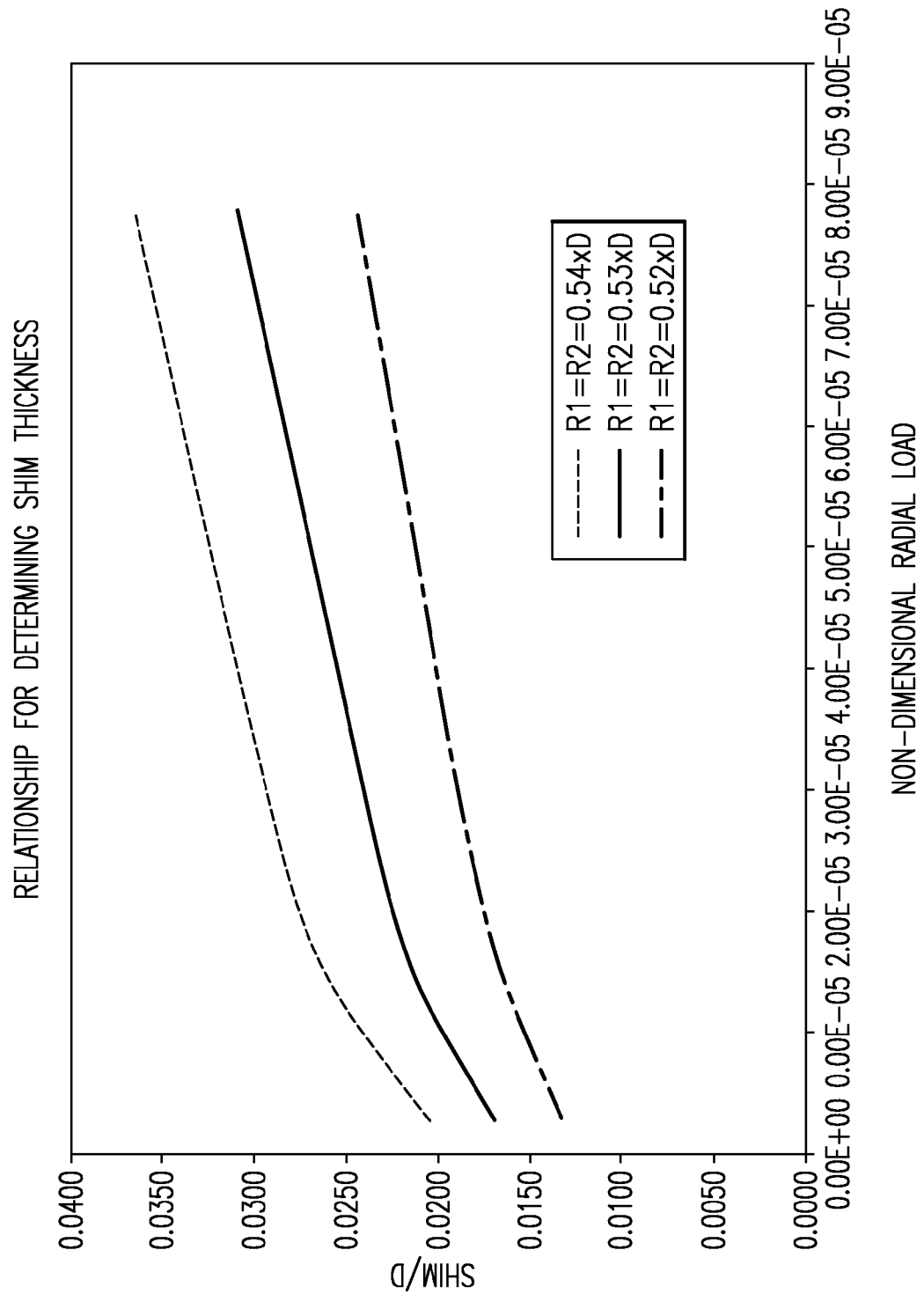

RADIAL BALL BEARING

BACKGROUND OF THE INVENTION

This disclosure relates to a bearing assembly and, more particularly, to a ball bearing assembly for a gas turbine engine.

A gas turbine engine includes various rotating components, such as shafts for example, which drive fan components and blade components associated with compressor and turbine sections of the gas turbine engine. Various types of bearings can be used to support the shafts for rotation relative to non-rotating engine structures.

For example, ball bearings can be used to support rotor shafts. In particular, split-race angular-contact ball bearings are often utilized due to their high thrust load capability and high reliability. The split-race bearing includes a one-piece outer race and a two-piece inner race with each inner race piece being separated at a split. Known split-race inner race ball bearings are designed to include a gothic-arch that is created by a discontinuous curved surface provided by the inner race pieces. During manufacturing, a shim piece is positioned between the inner race pieces, and both pieces are then machined to have curved surfaces with a common center point. After machining, the shim is removed and the pieces are assembled to provide the gothic arch. Optionally, the two inner races can be machined separately to have a common radius of curvature.

The gothic arch configuration prevents a ball bearing element from contact with the split, break-edges at the split, or radial oil slots when there is no thrust load and a very light radial load. When the ball bearing element contacts the split, high stresses can be produced at the contact area. Due to high stresses encountered when ball-to-split contact is made, traditional split race bearings are utilized only in conditions where there is thrust load applied under heavy radial loading. As such, traditional split race bearings are not used for applications where pure radial loading conditions could occur.

Accordingly, there is a need for a split-race bearing that can take advantage of high thrust load capability as well as being able to accommodate pure radial loading under high radial load conditions.

SUMMARY OF THE INVENTION

A bearing assembly includes an inner race having a first portion and a second portion separated from the first portion by a split. The first portion includes a first curved inner race support surface defined by a first center point and the second portion includes a second curved inner race support surface defined by a second center point that is non-coincident with the first center point.

In one example, the bearing assembly includes an outer race and a ball bearing element located between the inner and the outer races.

In one example, the bearing assembly is incorporated into a gas turbine engine including a fan section, a compressor section downstream of the fan section, a combustion section downstream of the compressor section, and a turbine section downstream of the combustion section. At least one of the fan, compressor, combustion, and turbine sections includes a rotating shaft. The inner race of the bearing assembly is associated with the rotating shaft and the outer race of the bearing assembly is associated with a non-rotating engine structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 7 is a graph depicting one example of a relationship for determining shim thickness.

DETAILED DESCRIPTION OF THE PREFERRED EMBODIMENT

Figure 1:
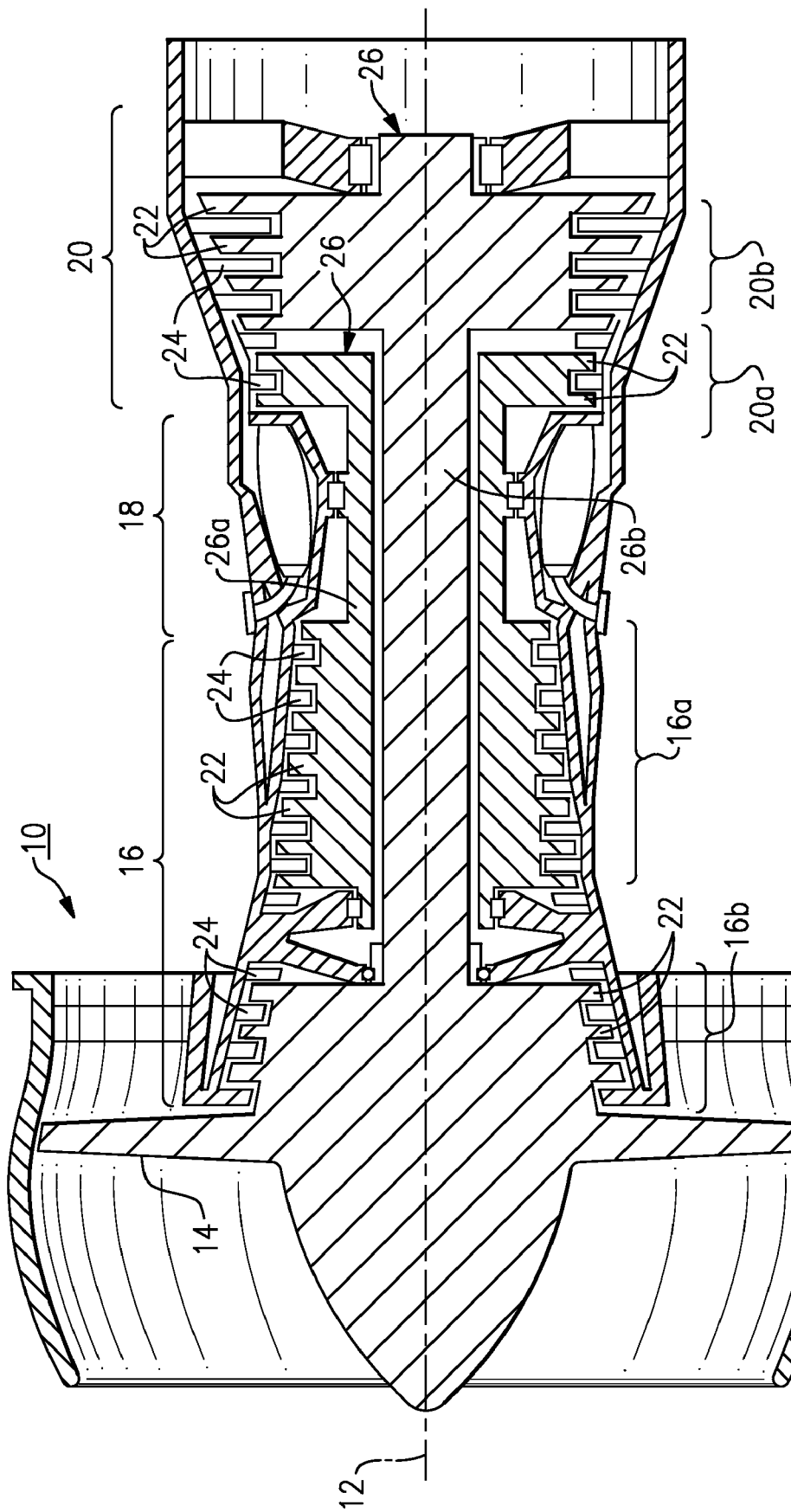
FIG. 1 is a schematic example of a gas turbine engine.

FIG. 1 illustrates selected portions of an example turbine engine 10, such as a gas turbine engine 10 used for propulsion. In this example, the turbine engine 10 is circumferentially disposed about an engine centerline 12. The turbine engine 10 includes a fan section 14, a compressor section 16, a combustion section 18, and a turbine section 20. The compressor section 16 and the turbine section 20 include corresponding blades 22 and vanes 24. The blades 22 are driven by rotating shafts 26 that define a common axis of rotation. Centers of the rotating shafts 26 and the axis of rotation coincide with the engine centerline 12.

The turbine section 20 includes a high pressure turbine (HPT) section 20a and a low pressure turbine (LPT) section 20b. Further, the compressor section 16 includes a high pressure compressor (HPC) section 16a and a low pressure compressor (LPC) section 16b. An outer rotating shaft 26a drives the blades 22 of the HPC section 16a and the HPT section 20a. An inner rotating shaft 26b, spaced radially inward of the outer rotating shaft 26a, drives the blades 22 of the LPC section 16b and the LPT section 20b. As is known, air compressed in the compressor section 16 is mixed with fuel and burned in the combustion section 18 to produce hot gasses that are expanded in the turbine section 20.

FIG. 1 is a schematic presentation for illustrative purposes only and is not a limitation on the disclosed examples. Additionally, there are various types of gas turbine engines, many of which could benefit from the examples disclosed herein and are not limited to the designs shown.

Figure 2:
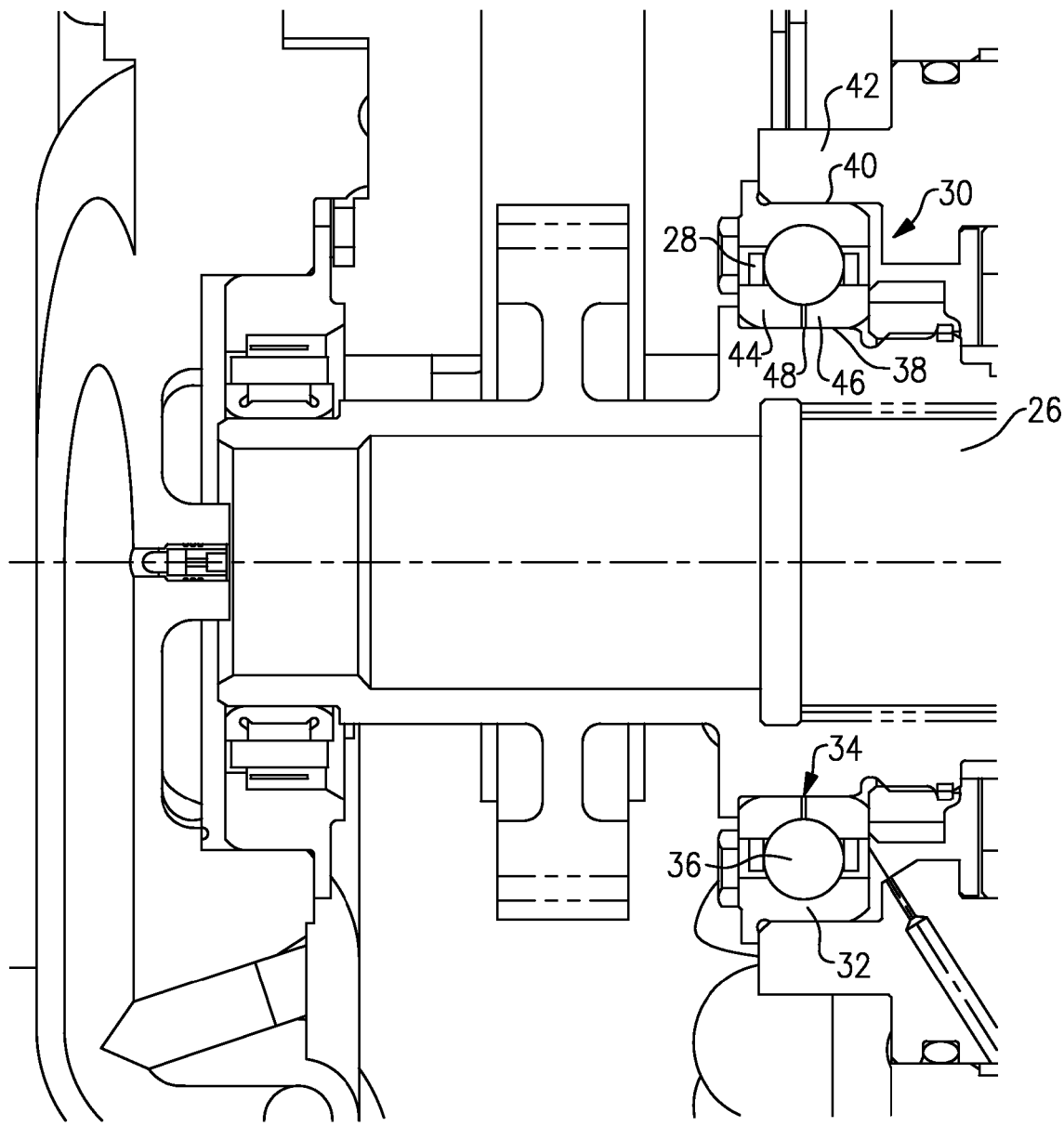
FIG. 2 is an example of a portion of the gas turbine engine that utilizes a split inner race ball bearing.

Bearing assemblies are used to rotatably support the rotating shafts 26 for rotation relative to a non-rotating engine structure. FIG. 2 shows one example of a ball bearing assembly 30 that is used to support a rotating shaft 26. The ball bearing assembly 30 could be used at any desired location within the gas turbine engine 10.

The ball bearing assembly 30 includes an outer race 32, an inner race 34, and a ball bearing element 36 that is located between the inner 34 and outer 32 races. The ball bearing element 36 comprises a plurality of roller balls supported within a cage 28 as known. The inner race 34 defines an inner circumferential surface 38 that is fixed to the rotating shaft 26. The outer race 32 defines an outer circumferential surface 40 that is fixed to a non-rotating engine structure 42, such as an engine casing for example. The inner race 34 comprises a split race that includes a first portion 44 and a second portion 46 that is separated from the first portion 44 by a split 48.

Figure 3:
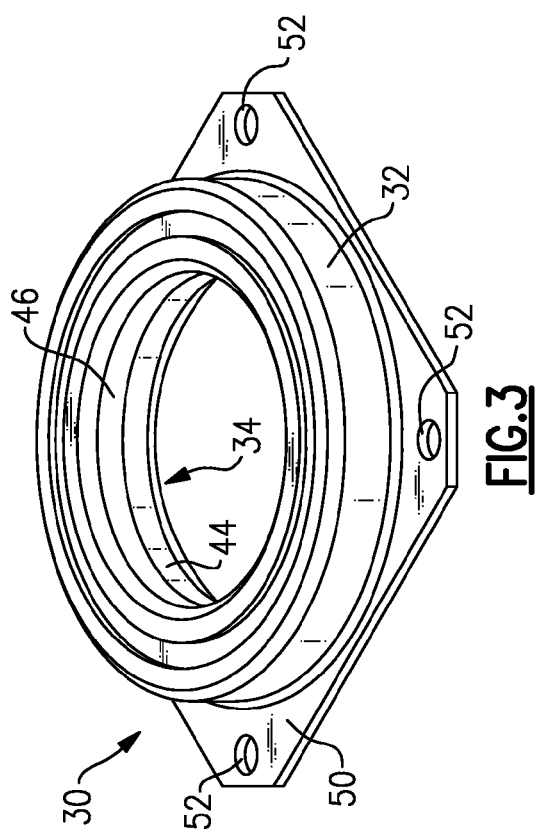
FIG. 3 shows a perspective view of an inner race of the split inner race ball bearing.

The bearing assembly 30 is shown in greater detail in FIGS. 3, 4, 5, and 6. As shown in FIG. 3, the outer race 32 of the bearing assembly 30 includes a mounting flange 50 with a plurality of apertures 52 to receive fasteners (not shown) such that the bearing assembly 30 can be mounted to the non-rotating engine structure 42 (see in FIG. 2).

Figure 5:
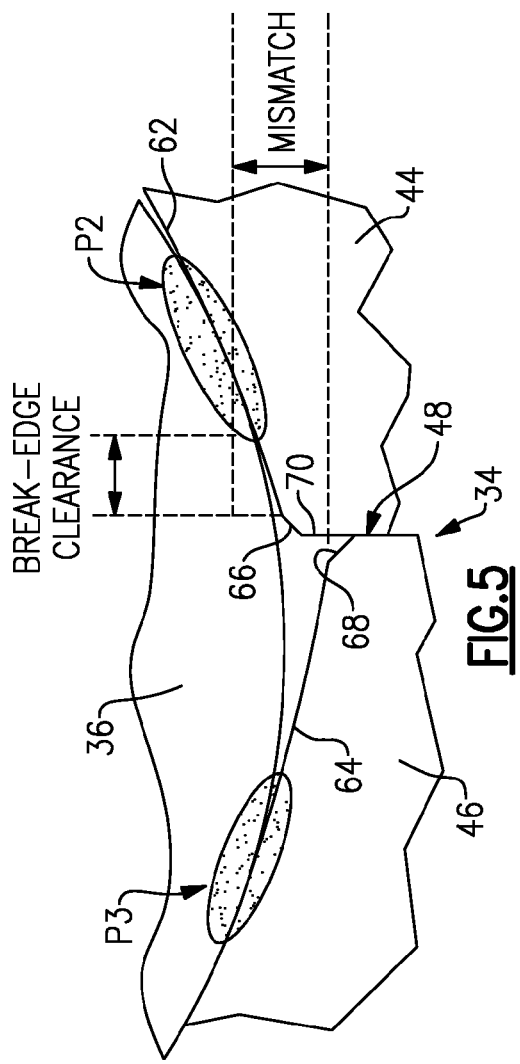
FIG. 5 is a schematic view of ball bearing element contact at the inner race.
Figure 4:
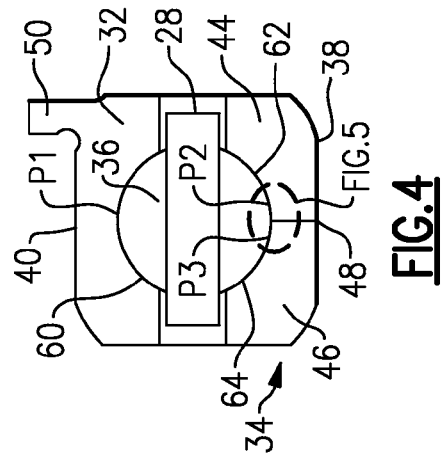
FIG. 4 is a cross-sectional view of the ball bearing shown in FIG. 3.

As shown in FIGS. 4 and 5, the bearing assembly 30 provides a three-point contact configuration that prevents the ball bearing element 36 from contacting the split 48. The outer race 32 has an outer race curved support surface 60. The first portion 44 of the inner race 34 has a first inner race curved support surface 62 and the second portion 46 has a second inner race curved support surface 64. A first point of contact P1 is between the outer race curved support surface 60 and the ball bearing element 36, a second point of contact P2 is between the first inner race curved support surface 62 and the ball bearing element 36, and a third point of contact P3 is between the second inner race curved support surface 64 and the ball bearing element 36.

The locations of the second P2 and third P3 points of contact are shown in greater detail in FIG. 5. The first 44 and second 46 portions of the inner race 34 are formed such that the ball bearing element 36 is forced away from contact with the split 48 even under pure high radial loading conditions. The first portion 44 includes a first portion break-edge 66 at the split 48 and the second portion 46 includes a second portion break-edge 68 at the split.

Figure 6:
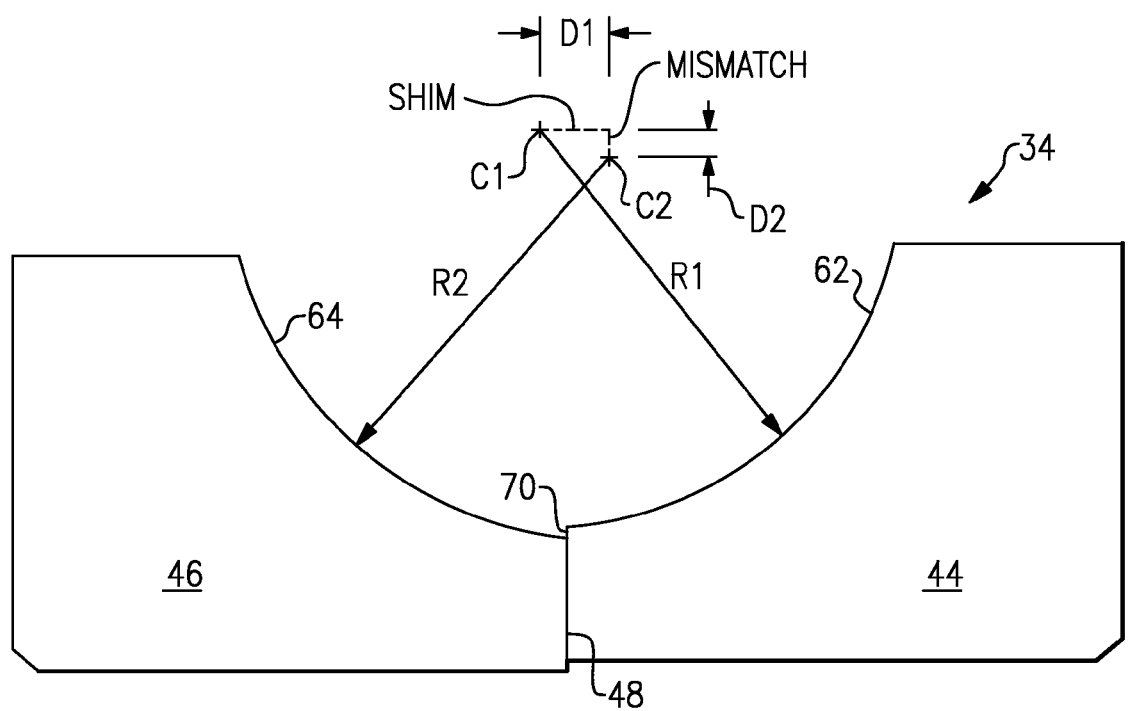
FIG. 6 is a schematic view showing radii of the inner race.

As shown in FIG. 6, the first inner race curved support surface 62 is an arcuate surface defined by a first center point C1 and a first radius R1 extending from the first center point C1. The second inner race curved support surface 64 is an arcuate surface defined by a second center point C2 and a second radius R2 extending from the second center point C2. The first C1 and second C2 center points are non-coincident.

The first C1 and second C2 center points are offset from each other in an axial direction. As shown in FIG. 6, the first C1 and second C2 center points are axially offset from each other by a first offset distance D1. The axial offset corresponds to an offset that extends in a direction defined by the axis of rotation, i.e. the engine centerline 12. The first offset distance D1 can also be referred to as a shim dimension.

The first C1 and second C2 center points can also be radially offset from each other by a second offset distance D2 due to manufacturing imperfection. The radial offset corresponds to an offset in a direction that extends radially outwardly from the axis of rotation, i.e. the engine centerline 12. The second offset distance D2 can also be referred to as a mismatch dimension and can result in a slight step formation 70. The first offset distance D1 can be adjusted as needed depending upon bearing size, application, and other design constraints.

The configuration of the axial offset provides an aggressive shim to keep the ball bearing element 36 from contacting the split 48 even under no thrust load and high radial load conditions. Further the mismatched curvatures of the first inner race curved support surface 62 and the second inner race curved support surface 64 are more open than in prior known configurations which keeps contact angles and friction low.

Prior known split race bearings have been designed to utilize thrust load to move the ball bearing element contact away from the split. With the example bearing assembly 30 shown in FIGS. 3-6, the bearing assembly 30 can accommodate high radial loads in combination with low or zero thrust loads by utilizing the radial mismatch discussed above.

In one known prior example with a zero thrust load, a known split-inner race ball bearing of pitch diameter 3.25 in (8.26 cm), ball size 0.438 in (1.113 cm), inner race shim of 0.002 in (0.005 cm), and inner-race curvature of 52% is predicted to have a capability of less than 20 lbs (9 kg) radial load before contact would occur at the split. In the example shown in FIGS. 3-6, the bearing assembly 30 under a zero thrust load condition could achieve in excess of 5000 lbs (2268 kg) radial load before contact would occur at the split.

FIG. 7 shows one example of a relationship that is used for determining shim thickness. As discussed above, the first C1 and the second C2 center points are offset from each other in an axial direction to define a shim dimension. In one example, a shim thickness is determined by setting a desired curvature for the first and second center points, and then converting the corresponding desired radial load capability for these curvatures into a non-dimensional radial load.

The non-dimensional radial load is determined according to a relationship of: $L/(NED^2)$, wherein:
  L=a maximum radial load on the bearing (force)
  N=the quantity of the number of rolling elements in the bearing
  E=the modulus of elasticity
  D=the diameter of the rolling elements Once the non-dimensional radial load has been determined, a relationship between shim thickness/D (D=diameter of rolling elements) that corresponds to the non-dimensional radial load is evaluated from the graph shown in FIG. 7.

On the vertical axis a length of the shim thickness/D relationship is depicted, and on the horizontal axis the non-dimensional radial load is depicted. The graph has an upper line (shown as a dashed line) for an example where R1=R2=0.54×D; a middle line (shown as a solid line) for an example where R1=R2=0.53×D; and lower line (shown as a long/short dashed line) for an example where R1=R2=0.52×D. As can be seen from the graph, the subject split-inner ring bearing has a non-dimensional radial load capability that is at least equal to or greater than 5.00E-06 and up to and exceeding 5.00E-05 without the aid of thrust load. This moves contact away from the split. Prior known bearings had a significantly lower radial dimensional load capability that was less than 5.00E-06.

It should be understood that additional shim thickness is required if mismatch, internal radial clearance (IRC), or break-edge dimensions exceed certain levels. For example, if the ratio of mismatch to the diameter of rolling elements (M/D) exceeds 0.0011, then additional shim thickness would be required, or if the ratio of IRC/D exceeds 0.005, or the ratio of break-edge/D exceeds 0.034, additional thickness would also be required.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A bearing assembly comprising:
   an inner race having a first portion and a second portion separated from said first portion by a split, wherein said first portion includes a first curved inner race support surface defined by a first center point, and wherein said second portion includes a second curved inner race support surface defined by a second center point that is non-coincident with said first center point;

an outer race; and
a ball bearing element located between said outer race and said inner race, and wherein said ball bearing element only has three contact points that comprise a first contact point between said outer race and said ball bearing element, a second contact point between said first portion of said inner race and said ball bearing element, and a third contact point between said second portion of said inner face and said ball bearing element.

2. The bearing assembly according to claim 1 wherein said outer race has an outer race curved support surface and wherein said ball bearing element is located between said outer race curved support surface and said first and said second inner race curved support surfaces, and wherein said first contact point is between said ball bearing element and said outer race curved support surface, said second contact point is between said ball bearing element and said first curved inner race support surface, and said third contact point is between said ball bearing element and said second curved inner race support surface.

3. The bearing assembly according to claim 2 wherein said inner race, said outer race and said ball bearing element cooperate to support a pure radial load under a no thrust load condition without said ball bearing element contacting said split.

4. The bearing assembly according to claim 2 wherein said first and said second portions define an inner circumferential surface that receives a rotor shaft that rotates about an axis of rotation, and wherein said outer race defines an outer circumferential surface that is associated with a non-rotating engine structure.

5. The bearing assembly according to claim 4 wherein said first and said second center points are offset from each other in an axial direction extending along said axis of rotation to define a shim offset distance.

6. The bearing assembly according to claim 2 wherein the bearing assembly can support a non-dimensional radial load that is equal to or greater than 5.00E-06 without the aid of thrust load to move ball bearing element contact away from the split.

7. The bearing assembly according to claim 6 wherein said non-dimensional load comprises $L/(N \times E \times D^2)$ which corresponds to a maximum radial load on the bearing (L) divided by a quantity of a total number of ball bearing elements (N) times the modulus of elasticity (E) times the diameter of the ball bearing elements (D) squared.

8. The bearing assembly according to claim 2 wherein said first and said second curved inner support surfaces are discontinuous from each other at said split, and wherein said first and said second center points are positioned relative to each other to prevent said ball bearing element from contacting said split.

9. The bearing assembly according to claim 1 wherein said first and second center points of said first and second portions of said inner race are axially and radially offset from each other.

10. A gas turbine engine comprising:
a fan;
a compressor section downstream of said fan;
a combustion section downstream of said compressor section;
a turbine section downstream of said combustion section wherein at least one of said fan, said compressor section, said combustion section, and said turbine section includes a rotating shaft; and
at least one ball bearing assembly that supports said rotating shaft for rotation relative to a non-rotating engine structure, said at least one ball bearing assembly including:
an outer race fixed to said non-rotating engine structure and having an outer race curved support surface;
an inner race fixed to said rotating shaft and having a first portion and a second portion separated from said first portion by a split, wherein said first portion includes a first curved inner race support surface defined by a first center point, and wherein said second portion includes a second curved inner race support surface defined by a second center point that is non-coincident with said first center point; and
a ball bearing element located between said outer race curved support surface and said first and said second inner race curved support surfaces, and wherein said ball bearing element has a fixed number of contact points that includes only a first contact point between said outer race and said ball bearing element, a second contact point between said first portion of said inner race and said ball bearing element, and a third contact point between said second portion of said inner race and said ball bearing element.

11. The gas turbine engine according to claim 10 wherein said rotating shaft defines an axis of rotation and wherein said first and said second center points are offset from each other in an axial direction extending along said axis of rotation.

12. The gas turbine engine according to claim 10 wherein said ball bearing can support a non-dimensional radial load that is equal to or greater than 5.00E-06 without the aid of thrust load to move ball bearing element contact away from the split.

13. The gas turbine engine according to claim 12 wherein said non-dimensional load comprises $L/(N \times E \times D^2)$ which corresponds to a maximum radial load on the bearing (L) divided by a quantity of a total number of ball bearing elements (N) times the modulus of elasticity (E) times the diameter of the ball bearing elements (D) squared.

14. The gas turbine engine according to claim 10 wherein said first and second center points of said first and second portions of said inner race are axially and radially offset from each other.

* * * * *